US00RE38851E

(19) United States
(12) Reissued Patent
Nakamura

(10) Patent Number: US RE38,851 E
(45) Date of Reissued Patent: Oct. 25, 2005

(54) SHOCK ABSORBING ARRANGEMENT FOR MARINE OUTBOARD DRIVE

(75) Inventor: Daisuke Nakamura, Hamamatsu (JP)

(73) Assignee: Yamaha Marine Kabushiki Kaisha, Shizuoka (JP)

(21) Appl. No.: 10/227,439

(22) Filed: Aug. 22, 2002

Related U.S. Patent Documents

Reissue of:
(64) Patent No.: 6,106,343
Issued: Aug. 22, 2000
Appl. No.: 09/257,613
Filed: Feb. 25, 1999

(30) Foreign Application Priority Data

Feb. 25, 1998 (JP) ..... 10-043495

(51) Int. Cl.[7] ..... B63H 20/10
(52) U.S. Cl. ..... 440/61 R; 440/53
(58) Field of Search ..... 440/61 R, 61 T, 440/56, 53

(56) References Cited

U.S. PATENT DOCUMENTS 4,718,330 A 1/1988 Mitton
4,786,263 A 11/1988 Burmeister et al.
5,149,286 A * 9/1992 Tsujii ..... 440/61 R
5,261,843 A * 11/1993 Tsujii et al. ..... 440/61 R
5,389,019 A 2/1995 Tsujii
5,882,235 A * 3/1999 Nakamura ..... 440/61 R

FOREIGN PATENT DOCUMENTS

DE 44 24 927 A 1/1996

* cited by examiner

*Primary Examiner*—Jesus D. Sotelo
(74) *Attorney, Agent, or Firm*—Knobbe, Martens, Olson & Bear, LLP

(57) ABSTRACT

A shock absorbing arrangement integrates in a compact manner into a fluid motor of a tilt cylinder, and consequently is particularly well suited for a small outboard drive that may only have a slimed tilt cylinder. The shock absorbing arrangement is provided in a piston for permitting flow from the first chamber to the second chamber upon the application of a predetermined force tending to cause the outboard drive to tilt-up. The shock-absorbing mechanism comprises a check valve assembly accommodated in a hollow space that is formed in the piston and is closed by a plug attached to the piston. A piston rod extends through the first chamber from the piston and is separately formed with the piston. The piston rod includes a passage that communicates with the hollow formed in the piston. A diameter of the passage provided in the piston rod is larger than the diameter of a valve seat for the check valve assembly in order to reduce fluid friction loss across the shock-absorbing valve assembly.

30 Claims, 9 Drawing Sheets

SHOCK ABSORBING ARRANGEMENT FOR MARINE OUTBOARD DRIVE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a shock absorbing arrangement for a marine outboard drive and more particularly to a shock absorbing arrangement for a compact tilt adjustment system that is particularly well suited for small outboard drive.

2. Description of Related Art

In a wide variety of outboard drives, both outboard motors and the outboard drive section of and inboard/outboard drive, a hydraulic tilt adjustment mechanism supports the outboard drive for tilting movement relative to a hull of an associated watercraft about a substantially horizontally disposed tilt axis. The tilt adjustment mechanism generally has a shock absorbing arrangement in case the outboard drive strikes an underwater obstacle so as to protect the drive from being seriously damaged.

FIGS. 1 and 2 illustrate an exemplary fluid motor assembly with a shock absorbing arrangement of a conventional tilt adjustment mechanism. FIG. 2 is a cross-sectional view taken along the line 2—2 in FIG. 1.

The fluid motor assembly, indicated generally by the reference numeral 1 in FIGS. 1 and 2, has a cylinder 2. The lower end 3 of the cylinder 2 is connected to a clamping bracket (not shown) that is affixed to an associated watercraft. The clamping bracket supports a swivel bracket (not shown) for pivotal movement about a horizontally disposed axis. A plug 4 is provided for closing the upper end of the cylinder 2. The cylinder 2 slidably supports a piston 5 that defines an upper chamber 6 and a lower chamber 7. A piston rod 8 is affixed to the piston 5 with a bolt 9 and the rod 8 extends through the upper chamber 6 outwardly through the plug 4. A washer 10 is interposed between the piston 5 and the bolt 9. The washer has a flange portion 11 that acts as a seat for a check valve assembly described later.

An upper end 12 of the piston rod 8 is connected to a swivel bracket that supports a drive unit (not shown) for pivotal movement about a vertically disposed axis. An opening 13 is provided at the upper portion of the cylinder 2 that is immediately below the plug 4, and then through the upper chamber 6 is connected to a fluid supply and control system (not shown). Meanwhile, another opening 14 is provided at the lower portion of the cylinder 2 that is immediately above the lower end 3 and thereby the lower chamber 7 is connected to the fluid supply and control system also. In other words, the upper chamber 6 and the lower chamber 7 are connected with each other through the fluid supply and control system. The hydraulic assembly 1 is filled with a hydraulic fluid. This hydraulic fluid is moved from the upper chamber 6 to the lower chamber 7 or vice versa by the fluid supply and control system and hence the piston rod 8 may extend until the piston 5 contacts the plug 4 and retract until the piston 5 contacts the lower end 4. By these movements, the outboard drive is tilted up or tilted down.

The piston 5 has a plurality of hollows 15 that are disposed at the periphery of the piston 5 at even intervals. These hollows 15 open to the lower chamber 7. The individual hollows 15 are also connected to the upper chamber 6 through apertures or passages 16. The arrangement of these apertures 16 is best seen in FIG. 2. A plurality of check valve assembly assemblies 17 are accommodated in the individual hollows 15. The check valve assembly 17 consists of a ball 18, a retainer 19 and a spring 20. The ball 18 is seated at a valve seat 21 formed at an upper end of the respective hollow 15. The diameter of the ball 15 is larger than the diameter of the valve seat 21. The spring 20 is placed between the retainer 19 that retains the ball 15 and the flange portion 11 of the washer 10 so that the ball 18 is urged against the valve seat 21 to close off fluid flow through the respective check valve assembly between the upper chamber 6 and the lower chamber 7.

When an underwater obstacle, such as a drift wood or a rock, is struck by the drive unit with sufficient force, the piston rod 8 will exert sufficient force on the piston 5 so as to overcome the action of the check valve assemblies 17. That is, the sufficient force on the piston 5 moves each ball 18 to an open position against the bias of the corresponding spring 20. Thus, the fluid in the upper chamber 6 can flow into the lower chamber 7 through the aperture 16 and the hollow 15. The flow of the fluid from the upper chamber 6 to the lower chamber 7 permits the piston 5 to move upwardly as indicated with the arrow 22 and, thus, allows the drive unit to pop up.

As described above and seen in FIGS. 1 and 2, the plurality of check valve assemblies 17 are provided at the periphery of the piston 5 so as to surround the connecting bolt 9. A relatively small outboard drive, however, can accommodate only a slim cylinder. Such a slim cylinder has a smaller diameter piston that often does not have enough space to accommodate the check valve assemblies around a connecting bolt. Because a piston rod should have almost the same thickness as that in a larger outboard drive for keeping its stiffness, little space exists to accommodate such value assemblies on a smaller diameter piston.

One shock absorbing arrangement that may resolve the problem noted above is disclosed in the U.S. Pat. No. 5,262,843. The construction of this cylinder, however, is complicated and thus costly to produce.

SUMMARY OF THE INVENTION

One aspect of the present invention is to provide a shock absorbing arrangement that is particularly suitable to a slimed cylinder for a relatively small outboard drive. Another aspect of the invention involves a shock absorbing arrangement that allows easy machining and assembling of members. In a preferred form, the invention is adapted to be embodied in an outboard drive that is supported for tilting movement relative to a hull of an associated watercraft about a substantially horizontally disposed tilt axis.

In accordance with one mode of this invention, a shock absorbing arrangement is provided for a tilt adjustment mechanism. The tilt adjustment mechanism comprises a fluid motor assembly that includes a cylinder. A piston is slidably supported in the cylinder and the piston defines first and second chambers. A piston rod extends from the piston through one of the chambers. The shock absorbing mechanism is provided for permitting fluid flow from the first chamber to the second chamber upon the application of a preset force tending to cause the drive unit to tilt up about a tilt axis. The shock-absorbing mechanism includes a check valve assembly accommodated in a hollow that is formed at least in part in the piston and is closed by a plug attached to the piston.

In accordance with anther aspect of this invention, a trim adjustment mechanism comprises a fluid motor assembly that includes a cylinder. A piston is slidably supported in the cylinder and defines first and second chambers. A piston rod is formed separately from the piston and is affixed to the piston in a manner extending through one of the chambers. A shock-absorbing mechanism is provided to permit fluid flow from the first chamber to the second chamber upon the application of a preset force tending to cause the drive unit to tilt up about a tilt axis. The shock absorbing mechanism includes a passage connecting the first chamber and to a hollow or another passage formed in the piston, and a check valve assembly that is principally accommodated in the hollow. The check valve assembly includes a valve seat that is located between the hollow and the passage and that has a smaller cross-sectional flow area than a cross-sectional flow area of the passage.

Further aspects, features and advantages of this invention will become apparent from the detailed description of the preferred embodiments which follow.

BRIEF DESCRIPTION OF THE DRAWINGS

As noted above, FIG. 2 is a cross-sectional view taken along the line 2—2 in FIG. 1. These figures are provided in order to assist the reader's understanding of the conventional shock absorbing arrangement and for the reader to better appreciate the aspects, features and advantages associated with the present invention.

FIG. 3 is a partial side elevational view showing an outboard motor attached to the transom of a watercraft (shown partially and in section) including a tilt and trim adjustment system.

FIG. 4 is an enlarged rear elevational view of the tilt and trim adjustment mechanism of FIG. 3.

FIG. 5 is a side elevational view showing a simplified tilt adjustment mechanism that is particularly suitable for a small outboard drive, with portions of a swivel bracket assembly shown in section.

FIG. 6 is a front elevational view of the tilt adjustment mechanism of FIG. 5.

FIG. 7 is a cross sectional view showing a cylinder of either the tilt and trim adjustment mechanism of FIGS. 3 and 4, or the tilt adjustment system of FIGS. 5 and 6, with the cylinder including a shock absorbing arrangement configured in accordance with a preferred embodiment of the present invention.

FIG. 8 is an enlarged partial cross sectional view showing the shock absorbing arrangement of FIG. 7.

FIG. 9 is a schematic diagram showing a fluid circuit for a hydraulic system that can be used with the tilt adjustment system of FIGS. 5 and 6 or the tilt and trim adjustment mechanism of FIGS. 3 and 4.

FIG. 10 is an enlarged partial cross sectional view showing a shock absorbing arrangement configured in accordance with another embodiment of the present invention.

FIG. 11 is a schematic diagram showing another fluid circuit for the hydraulic system that can be used with the tilt and trim adjustment system of FIGS. 3 and 4, as well as the tilt adjustment system of FIGS. 5 and 6.

DETAILED DESCRIPTION OF THE PREFERRED EMBODIMENTS OF THE INVENTION

Figure 1:
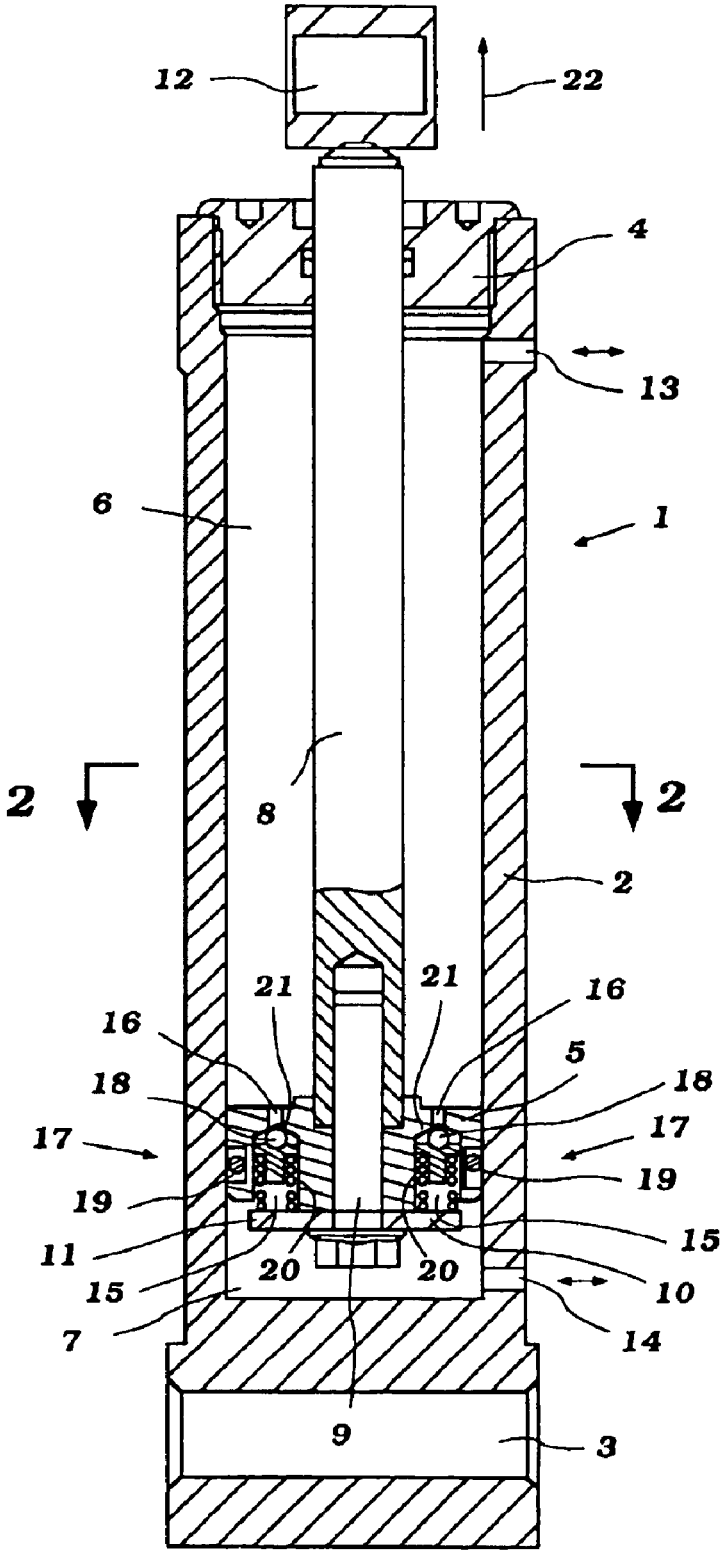
Figure 1 Prior Art
FIGS. 1 and 2 illustrate an exemplary shock absorbing arrangement employed with a conventional tilt adjustment mechanism.
Figure 2:
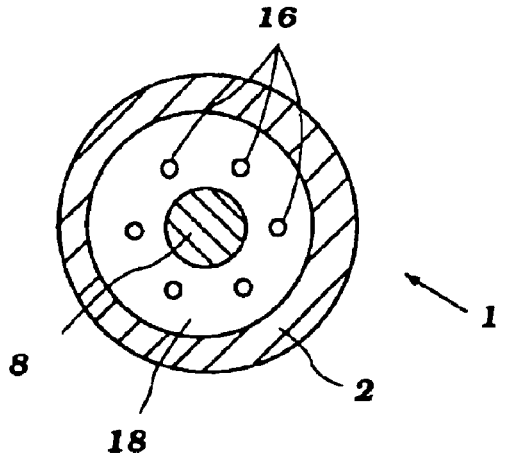
Figure 2 Prior Art
Figure 3:
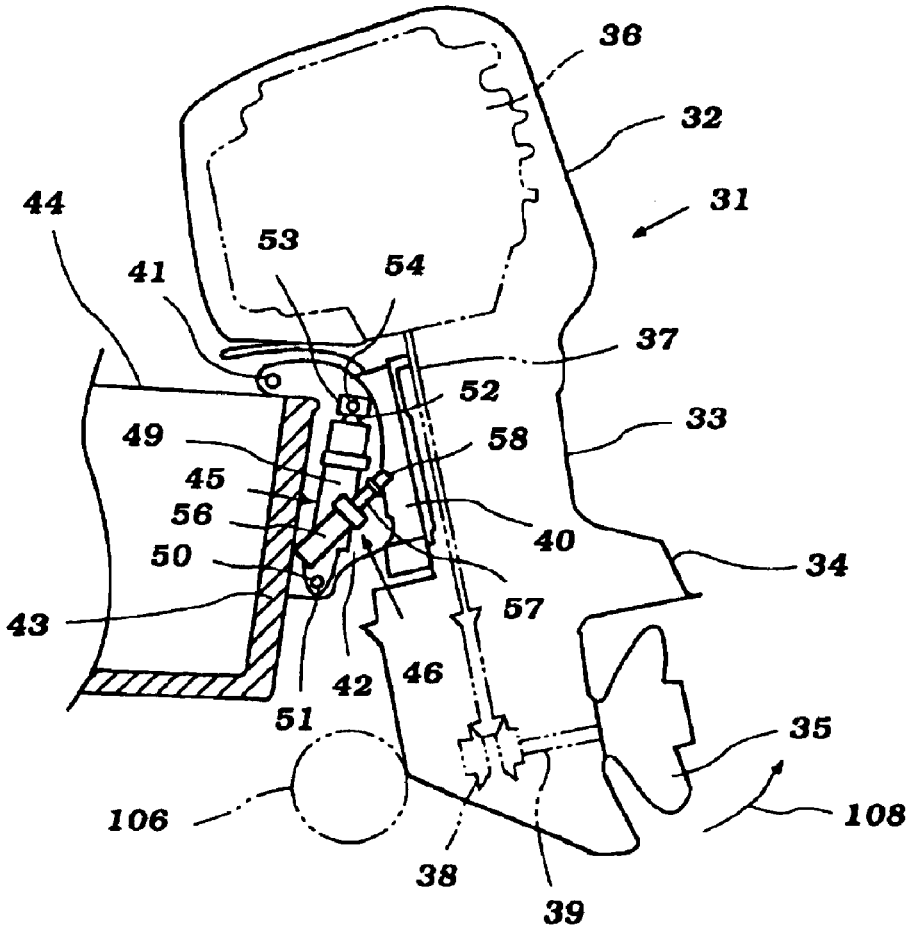
FIGS. 3 and 4 illustrate a relatively large outboard motor and a tilt and trim adjustment mechanism in which a present shock absorbing arrangement can be provided.
Figure 4:
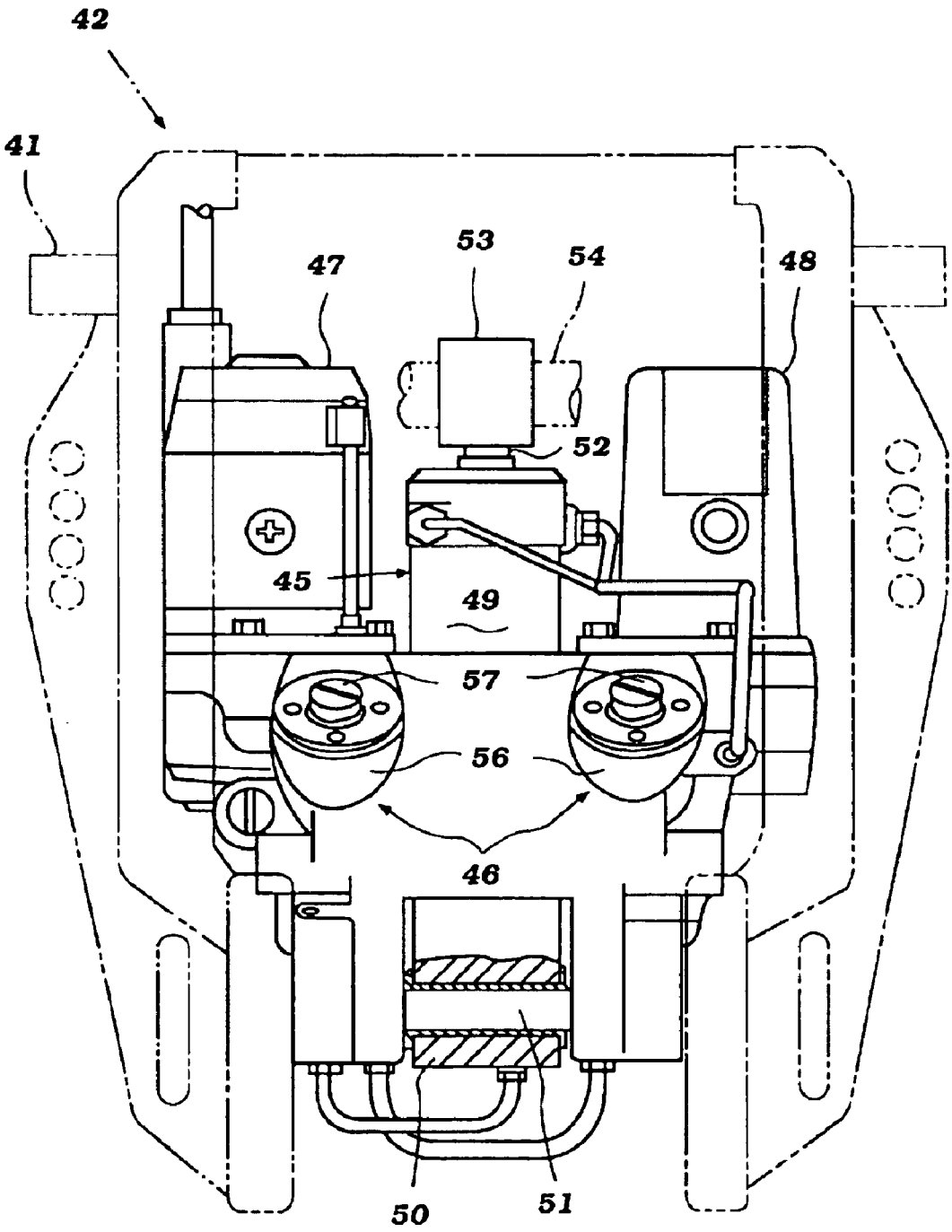

With reference initially to FIGS. 3 and 4, the general environment in which the invention may be practiced is illustrated. An outboard motor, indicated generally by the reference numeral 31, comprises the outboard drive in this embodiment. The term "outboard drive" is utilized to describe either an outboard motor or the outboard drive portion of an inboard/outboard drive. In addition, as further appreciated from the description below, the present shock-absorbing arrangement can be used with a tilt and trim adjustment system, such as that depicted in FIGS. 3 and 4, which include both trim cylinders and a tilt cylinder, with a tilt adjustment system, such as that depicted in FIGS. 5 and 6, which includes a single cylinder to effect both tilt and trim movement of the outboard drive, and with other types of outboard drive positioning system utilizing one or more fluid motor.

The outboard motor 31 includes a power head 32 and a drive shaft housing 33 that depends from the power head 32. A lower unit 34 is provided at the lower end of the drive shaft housing 33 and supports the propeller 35. The power head 32 accommodates a combustion engine 36 therein and the drive shaft housing 33 contains a drive shaft 37 that extends from the engine 36 to a bevel gear 38 in the lower unit 34. The bevel gear 38 transmits power from the engine 36 to the propeller 35 through a propeller shaft 39. In this manner, the engine 36 drives the propeller 35 (or another type of propulsion device).

A steering shaft (not shown) is fixed in a known manner to the drive shaft housing 33 and is journaled for steering movement about a generally vertically extending axis within a swivel bracket 40. The swivel bracket 40, in turn, is pivotally connected by means of a pivot pin 41 to a clamping bracket 42. The pivot pin 41 permits tilting movement of the outboard drive 31 about the horizontally disposed axis defined by the pivot pin 41 for either trim adjustment or for tilt-up and pop-up of the outboard drive 31. The clamping bracket 42 is affixed to a transom 43 of a watercraft 44 in a known manner.

Figure 5:
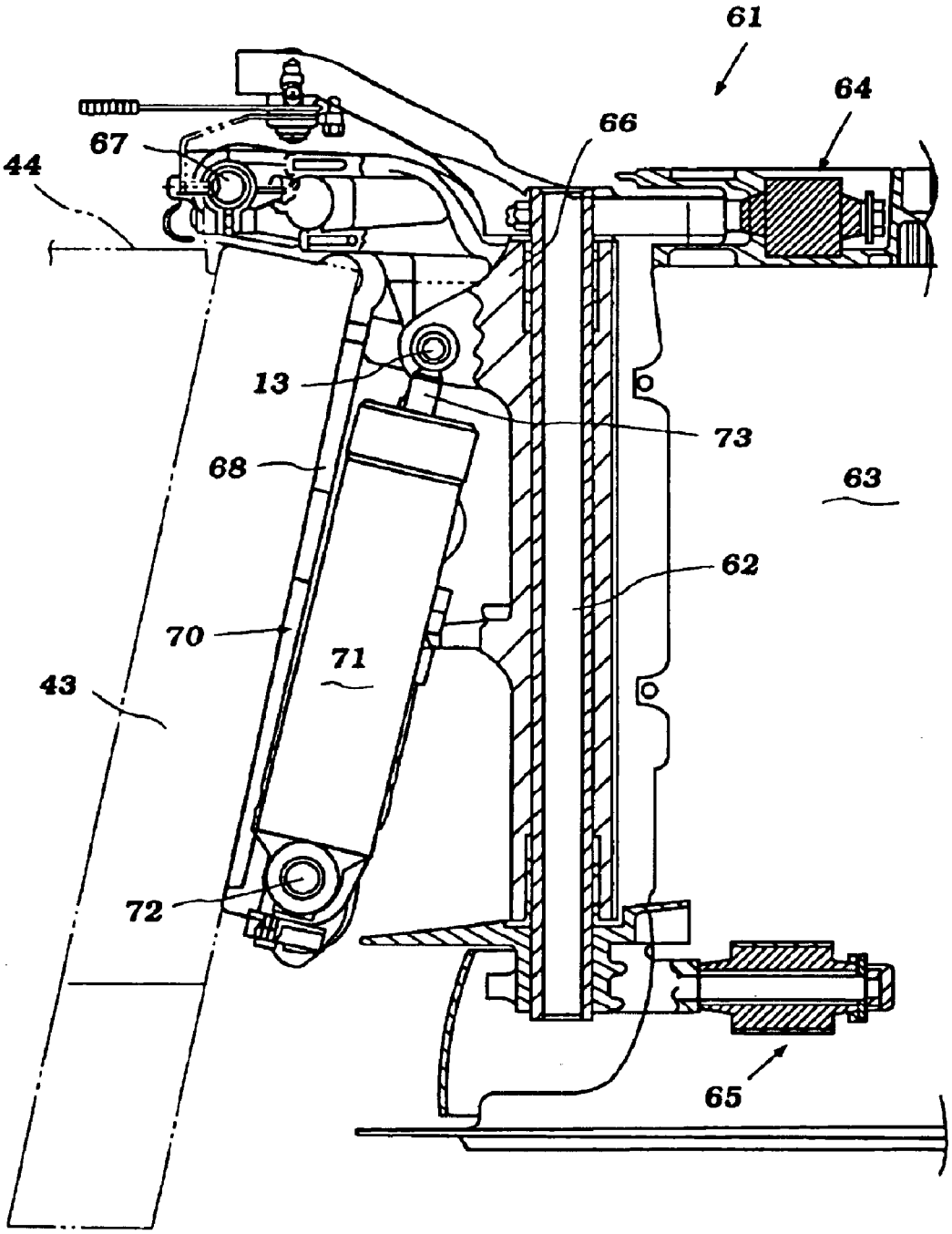
FIGS. 5 and 6, however, illustrate a smaller outboard motor and a tilt adjustment mechanism in which the present shock absorbing arrangement is particularly well suited.
Figure 6:
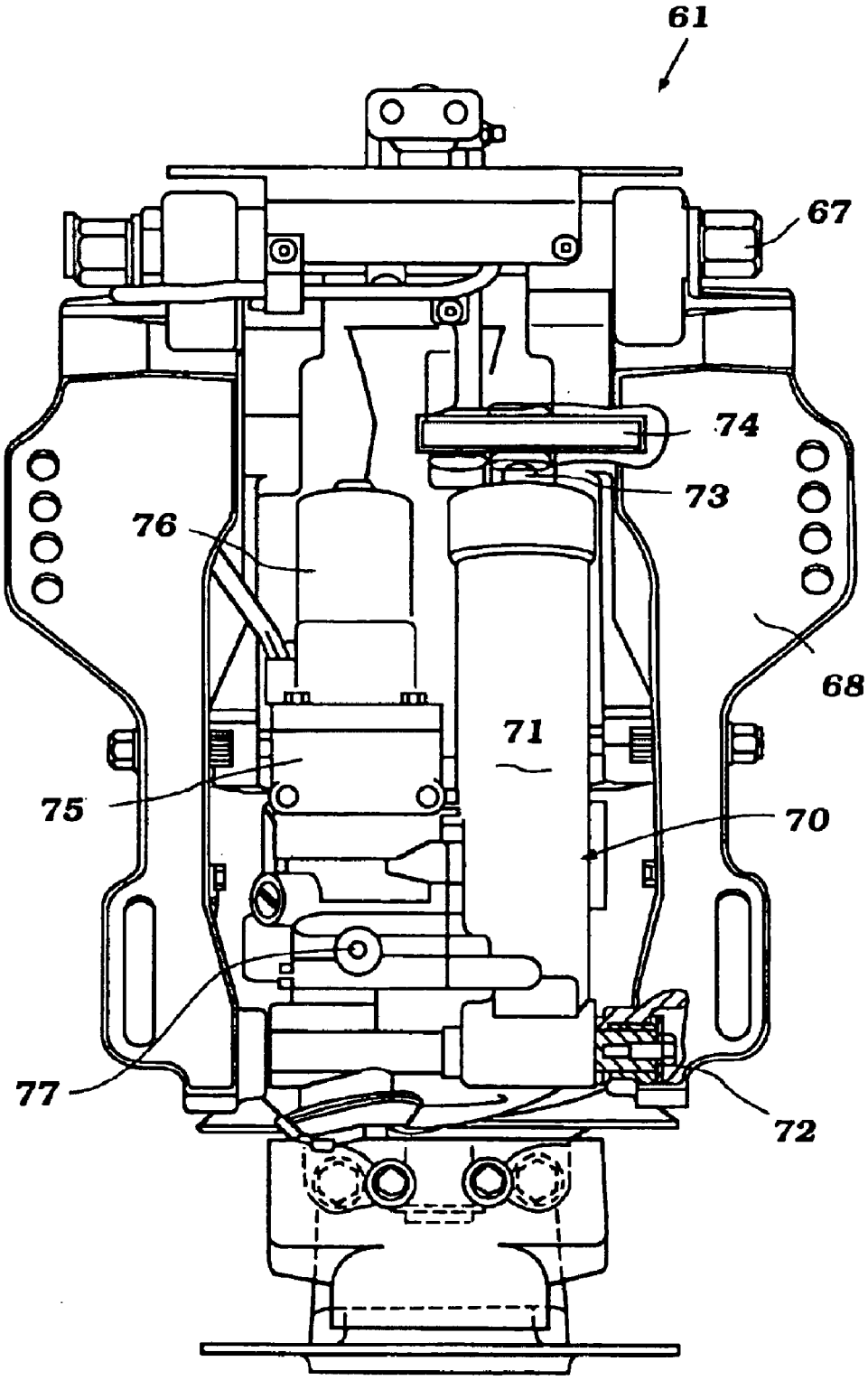

A tilt and trim adjustment mechanism operates generally between the outboard motor 31 and the transom 43 to effect tilt and trim movement. The tilt and trim adjustment mechanism more specifically operates between the clamping bracket 42 and the swivel bracket 40. In the illustrated embodiment, the tilt and trim adjustment mechanism includes a tilt cylinder assembly 45 and a trim cylinder assembly 46. Tilting movement of the outboard drive 31 is controlled primarily by means of the tilt cylinder assembly 45 while the trim condition of the outboard drive 31 is controlled primarily by means of the trim cylinder assembly 46. The tilt and trim adjustment mechanism, however, can include a cylinder assembly that effects movement of the outboard motor both through a trim range of movement and to a fully tilted up position, as illustrated in FIGS. 5 and 6.

The tilt cylinder assembly 45 and trim cylinder assembly 46 are both fluid motors that are powered by pressurized working fluid delivered by a fluid pump 47 (see FIG. 4). The pump 47 is driven by a reversible electric motor (not shown) in a known manner. A fluid reservoir 48 communicates with the fluid pump 47. The structure of the outboard drive 31 and its tilt and trim arrangement as thus far described may be considered to be conventional.

The tilt cylinder assembly 45 includes a cylinder housing 49 that is formed with a trunnion 50. The trunnion 50 is pivotally connected to the clamping bracket 42 by means of a pivot pin 51. The cylinder housing 49 is divided into a pair of fluid chambers by a piston to which a piston rod 52 is connected. The piston rod 52 extends through the upper end of the cylinder housing 49 and has, affixed to it, a connecting member 53. The connecting member 53 is pivotally connected to the swivel bracket 40 by means of a pivot pin 54. It should be readily apparent, therefore, that extension and retraction of the piston rod 52 will effect pivotal movement of the swivel bracket 40 relative to the clamping bracket 42 for pivoting the outboard drive 31 about the pivot pin 41. The tilt cylinder assembly 45 is a high speed, low force fluid motor and is normally employed for pivoting the outboard drive 31 from a trim up condition to a tilted up out of the water condition.

A shock absorbing arrangement is incorporated in the tilt cylinder assembly 45 for a pup-up movement of the outboard drive 31. The shock absorbing arrangement will be described later in detail.

The trim cylinder assembly 46 is affixed to a clamping bracket 42. The trim cylinder assembly 46 includes a pair of cylinder housings 56 that are disposed on either side of the tilt cylinder assembly 55. Like the tilt cylinder 49, the trim cylinder housing 56 is divided into an upper and lower section by a piston. The trim cylinder housing 56, however, is rigidly affixed to the clamping bracket 42. A piston rod 57 is rigidly affixed to the piston of the trim cylinder assembly 55. This trim piston rod 57 normally bears directly against the swivel bracket 40 for effecting its pivotal movement. The piston rod 57 reciprocates along a fixed axis while the swivel bracket 40 pivots about the pivot pin 41. The swivel bracket has a thrust taking member 58. The top end of the piston rod 57 contacts the thrust taking member 58. Accordingly, extension and retraction of the piston rod 57 will effect pivotal movement of the swivel bracket 40 also relative to the clamping bracket 42 for pivoting the outboard drive 31 about the pivot pin 41 within a trim range of movement.

Another outboard drive 61 is shown in FIGS. 5 and 6 and includes a tilt adjustment mechanism. This outboard drive 61 is smaller than the outboard drive 31 described above, has no trim adjustment device, and includes a single slim cylinder to effect tilt and trim movement of the outboard drive 61. The present shock absorbing arrangement is particularly well suited for this type of outboard drive 61, but not limited to it.

A steering shaft 62 is fixed to the drive shaft housing 63 with an upper mount assembly 64 and a lower mount assembly 65, and is journaled for steering movement about a generally vertically extending axis within a swivel bracket 66. The swivel bracket 66, in turn, is pivotally connected by means of a pivot pin 67 to a clamping bracket 68. The pivot pin 67 permits tilting movement of the outboard drive 61 about the horizontally axis defined by the pivot pin 67 for tilt-up and pop-up operation of the outboard drive 61. The clamping bracket 68 is affixed to the transom 43 of the watercraft 44, in a fashion similar to that noted above in connection with the outboard drive 31.

A tilt cylinder assembly 70 is a fluid motor and is provided for tilt adjustment operation and also for the pop-up movement of the outboard drive 61. The tilt cylinder assembly 70 includes a cylinder housing 71. The lower end of the cylinder housing 71 is pivotally connected to the clamping bracket 68 by means of a pivot pin 72. The cylinder housing 71 is divided into a pair of chambers by a piston to which a piston rod 73 is connected. The piston rod 73 extends through the upper end of the cylinder housing 71 and is pivotally connected to the swivel bracket 66 by means of a pivot pin 74.

The tilt cylinder assembly 70 is powered by pressurized working fluid delivered by a fluid pump 75. The pump 75 is driven by a reversible electric motor 76. A switch valve 77 is provided for switching flows of the working fluid between the chambers in tilt operations.

Because the tilt operation of this cylinder assembly 70 is essentially similar to that of the tilt cylinder assembly 45, no further description is believed necessary for an understanding and appreciation of the invention. It therefore should be apparent that the present shock-absorbing mechanism can be used with, but not limited solely to, both types of outboard drive positioning systems described above. The following description thus uses the corresponding reference numerals to illustrate further this aspect of the invention; the first reference numeral relates to the corresponding component of the tilt and trim adjustment mechanism of FIGS. 3 and 4, while the second reference numeral, which is placed in parentheses, relates to the corresponding component of the tilt adjustment mechanism of FIGS. 5 and 6.

Figure 7:
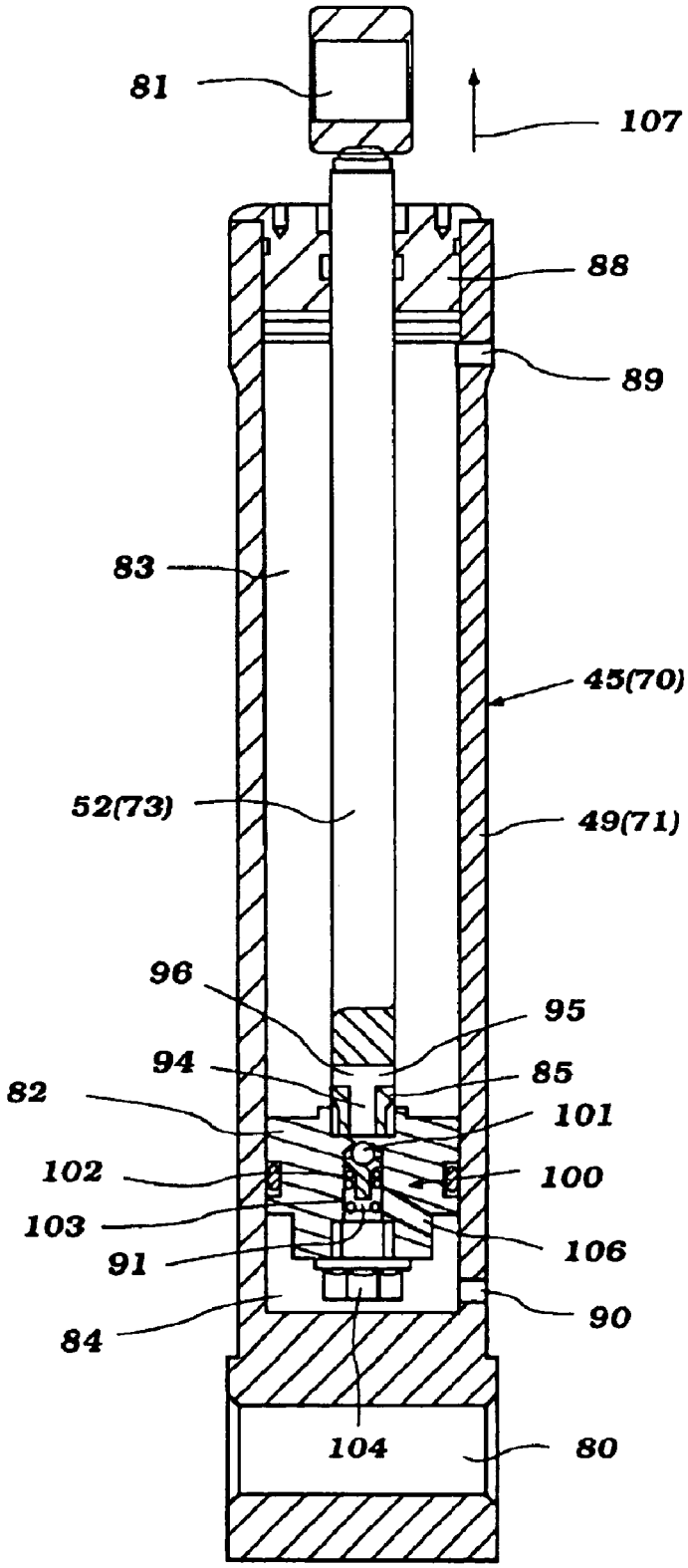
FIG. 7 to 11 illustrate preferred embodiments of the present shock absorbing arrangement in detail. These figures of preferred embodiments are intended only to illustrate the invention, and not to limit it. The following further describes these figures of the embodiments.
Figure 8:
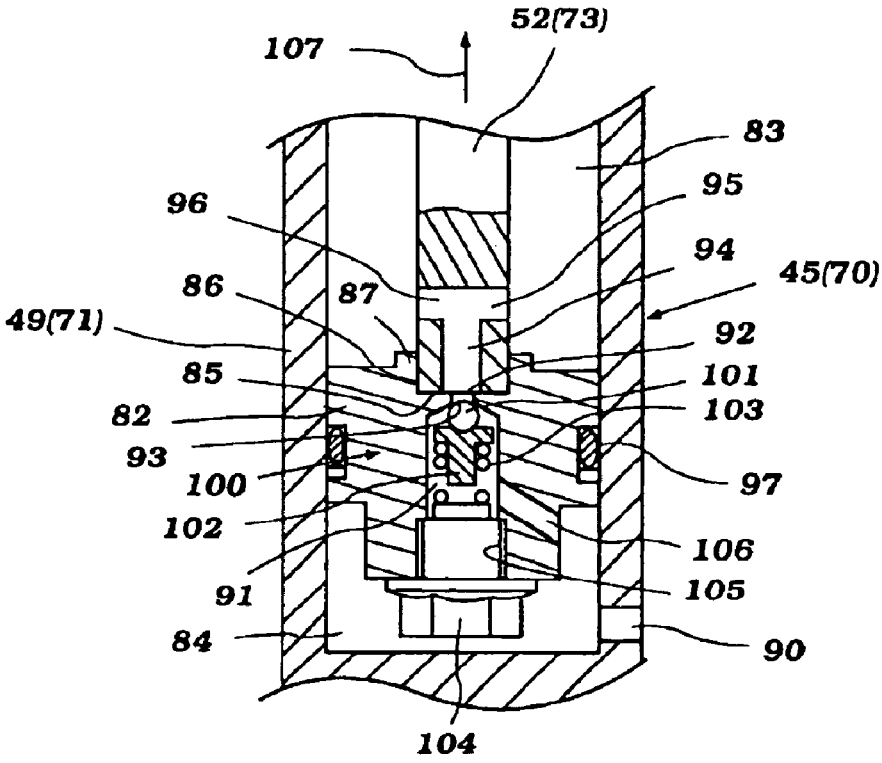
Figure 9:
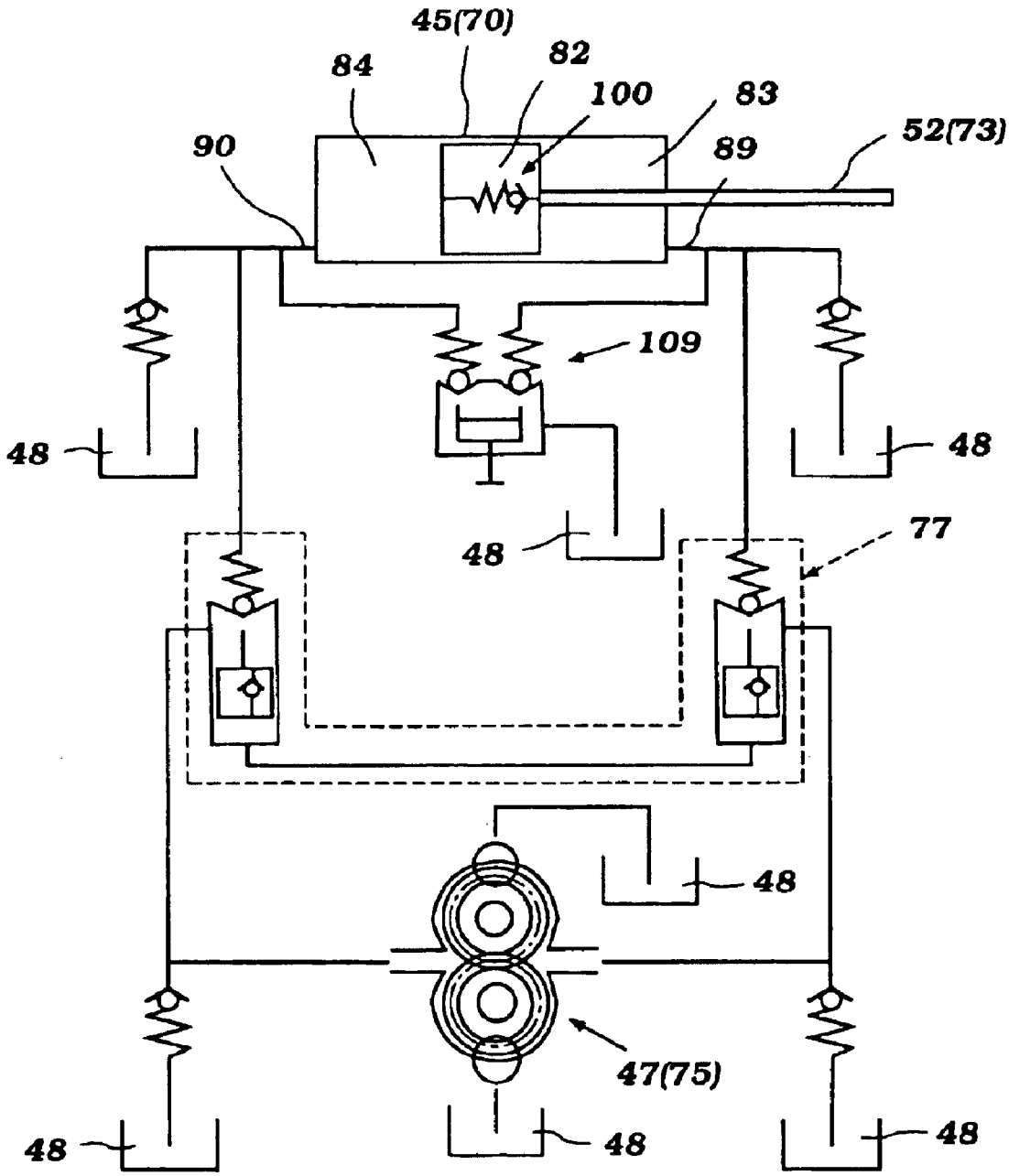

With reference now to FIGS. 7, 8 and 9, a preferred embodiment of the present shock absorbing arrangement will be described in detail.

The hydraulic tilt assembly 45 (70), the cylinder 49 (71) and the piston rod 52 (73) have been described above. Also, the lower end 80 (trunnion 50 in FIG. 3) of the cylinder 49 (71) is connected to the clamping bracket 42 (68), while the upper end 81 (connecting member 53 in FIG. 3) is connected to the swivel bracket 40 (66) as described above. It is understood, however, that the orientation of the cylinder 49 (71) can be reversed so as to be fixed to the swivel bracket 40 (71) with the piston rod 52 (73) connected to the clamping bracket 42 (68), in which case, the following descriptional terms related to orientation, such as, for example, "upper" and "lower," would be reversed.

The cylinder 49 (71) slidably supports a piston 82 that defines an upper chamber 83 and a lower chamber 84. The piston rod 52 (73) is affixed to the piston 82, but preferably these components are separately formed and coupled together. In the illustrated embodiment, the piston rod 52 (73) has a male threaded end 85 and the piston 82 has a female threaded recess 86, and both of the male threaded end 85 and the female threaded recess 86 are jointed by screwing the male end 85 into the female recess 86. A periphery about the recess 86 in the piston 82 forms a bulge 87 so that the threaded area is elongated.

A plug 88 closes the top end of the cylinder 49. The piston rod 52 (73) extends through the upper chamber 83 and outwardly through the plug 88.

An opening 89 is provided at the upper portion of the cylinder 49 (71) at a position immediately below the plug 88. The opening 89 connects the upper chamber 83 to a fluid supply and control system which, as understood from FIG. 9, includes the fluid pump 47 (75), the fluid reservoir 48 and the switch valve 77. Meanwhile, another opening 90 is provided at the lower portion of the cylinder 49 (71) at a position immediately above the lower end 80 and thereby the lower chamber 84 is connected to the fluid supply and control system also. In other words, the upper chamber 83 and the lower chamber 84 are connected with each other through the fluid supply and control system. The hydraulic assembly 45 (70) is filled with a hydraulic fluid. This hydraulic fluid is moved from the upper chamber 83 to the lower chamber 84 or vice versa by the fluid supply and control system and hence the piston rod 52 (73) can extend until the piston 82 contacts the plug 88 and retract until the piston 82 contacts the lower end 80. By these movements, the outboard drive is tilted up or tilted down.

The piston 82 has a hollow 91 immediately under the lower end 85 of the piston rod 52 (73). In the illustrated embodiment, the hollow 91 has a generally cylindrical shape, is aligned with the axis of the piston rod 52 (73), and is placed within a projected area of the piston rod 52 (73); that is, within a cylindrical space in the piston 82 directly below the piston rod 52 (73) defined by imaginably continuing the piston rod 52 (73) through the piston 82. The hollow 91 is connected to the upper side of the piston 82 through a passage 92. An inner end of the hollow 91, i.e., the portion where passage 92 opens to the hollow 91, forms a valve seat 93 for a check valve assembly described later. The lower end 85 of the piston rod 52 (73), in turn, includes a passage 94 that is aligned with the axis of the piston rod 52 (73). The passage 94 opens to the upper chamber 83 through a pair of apertures (branch passages) 95, 96. The other end of the passage 94 opens to the end of the piston rod 52 (73) and hence into the passage 92 in the piston 82 such that the passage 94 in the piston rod 52 (73) and the passage 92 in the piston together form a passageway between the valve seat 93 and the upper chamber 83. The diameter of the passage 94 is larger than the passage 92, i.e., valve seat 93. And while the passage 92 has generally a uniform diameter in the illustrated embodiment, it is understood that the smallest diameter or cross-sectional flow area of the passage 92 desirably is larger than the diameter of the valve seat 93. A larger diameter passage 94 can be formed in the piston rod 52 (73) because the rod 52 (73) is not unitary with the piston. The larger diameter passage 94 reduces fluid friction loss through the passage 94, and consequently across the valve assembly.

A seal ring 97, in addition, is provided around the piston 82 for preventing the fluid in the upper chamber 83 or the lower chamber 84 from moving to the other chamber by passing through the gap between the outer surface of the piston 82 and inner surface of the cylinder 49 (71).

A check valve assembly 100 is principally accommodated in the hollow 91; all of the components of the valve assembly 100 are arranged within the hollow 91 with the valve seat 93 formed on the upper end of the hollow 91. The check valve assembly 100 consists of a ball 101, a retainer 102 and a spring 103. The diameter of the ball 101 is larger than the diameter of the passage 92 so that the ball 101 is seated at the valve seat 93. The retainer 102 retains the ball 101. A plug 104 is provided for closing the hollow 91. The plug 104 is a bolt-like member and is screwed into the hollow 91 which has a female threaded surface 105. The spring 103 is placed between the retainer 102 and the plug 104 so that the ball 101 is urged against the valve seat 93 to block fluid flow between the upper chamber 83 and the lower chamber 84. Another passage 106 is provided in the piston 82 for connecting the hollow 91 and the lower chamber 84. The check valve assembly 100, the hollow 91, passages 92, 93, 94, 95, 96 and 106 all form the shock-absorbing mechanism (i.e., a damping mechanism). Thus arranged, fluid flow from the upper chamber 83 is permitted to the lower chamber 84 upon the application of a preset force tending to cause the outboard drive 31 (61) to tilt-up about the tilt axis 41 (67). The amount of the force required to open the valve 100 is established by the stiffness of the spring 103, and thus such force is preset by selecting the stiffness of the spring 103.

Like the action with the conventional arrangement, when an underwater obstacle 106 (see FIG. 3) such as a drift wood or a rock is struck by the outboard drive 31 (61) with sufficient force, the piston rod 52 (73) will exert sufficient force on the piston 82 so as to overcome the action of the check valve assembly 100. That is, the sufficient force on the piston 82 moves the ball 101 to an open position against the bias of the spring 103. Thus, the fluid in the upper chamber 83 can flow into the lower chamber 84 through the passages 94, 95 and 96 in the piston, and through the upper passage 92, the valve seat 93 the hollow 91, and the lower passage 105 in the piston 52 (73). The flow of the fluid from the upper chamber 83 to the lower chamber 84 allows the piston 82 to move upwardly as indicated with the arrow 107 and permits the outboard drive 31 (61) to pop-up as indicated by the arrow 108 in FIG. 3. After striking the underwater obstacle, the fluid in the lower chamber 84 must return to the upper chamber 83 in order to lower the outboard drive 31 (61) down. For this purpose, a manual valve 109 (see FIG. 9) is provided between the upper opening 89 and the lower opening 90 of the cylinder 49 (71). Thus, when an operator opens the manual valve 109, the fluid in the lower chamber 84 immediately returns to the upper chamber 83 and then the outboard drive 31 (61) can be lowered.

In this first embodiment as described above, in addition to the compact nature, the check valve assembly 100 can be easily inserted into and removed from the hollow 91 and then closed by the plug 104. Further, since the piston rod 52 (73) is formed separately with the piston 82, the passage 94 as well as the branch passages 95 and 96 may have a diameter larger than that of the valve seat 93. Accordingly, machining of these apertures 94, 95 and 96 with such a relatively long and slim rod member can be easily done also. Furthermore, the piston rod 52 (73) can be jointed with the piston 82 by screw connection. Thus, durable connection of the both members is ensured.

Figure 10:
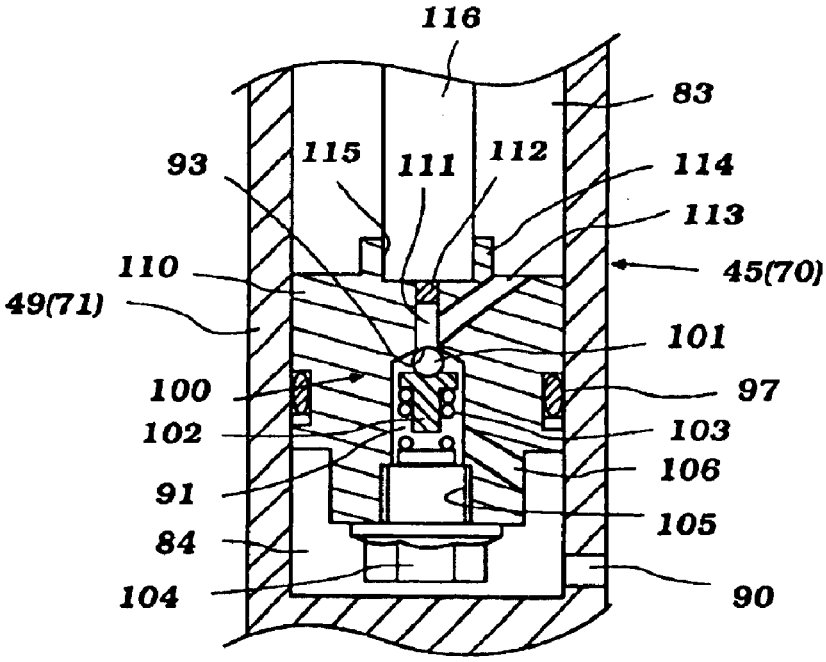

Another preferred embodiment is shown in FIG. 10. The same members or components as described in connection with the arrangement shown in FIGS. 7 and 8 have the same reference numerals so as to avoid repetitions and to indicate common components between the two embodiments. Accordingly, unless indicated otherwise, the foregoing description of such common components should be understood to apply equally to the corresponding components of the present embodiment.

The piston 110 is somewhat longer than the piston 82 and the passage 111 is also longer than the upper passage 92 in the first arrangement. The opening of the passage 111 is closed with a small plug 112 and another passage 113 is pierced between a middle portion of the passage 111 and the upper chamber 83 so that the hollow 91 can be connected with the upper chamber 83. The diameter of the branch aperture 113 is slightly larger than that of the passage 111.

A bulge 114 is formed at the top of the piston 82 and a recess 115 is made at the bulge 114. The lower end of a piston rod 116 is forced into the recess 115. Thus, the piston 82 and the piston rod 116 are connected by press fitting. The other structure is the same as described with the first embodiment.

In this embodiment, when an underwater obstacle is struck, the same action occurs in the shock absorbing arrangement and the fluid in the upper chamber 83 may flow into the lower chamber 84 through the passages 113 and 111, the hollow 91 and the passage 106. The flow of the fluid from the upper chamber 83 to the lower chamber 84 allows the piston 82 to move upwardly and the drive unit to pop-up. After the strike of the underwater obstacle, the fluid in the lower chamber 84 will return to the upper chamber 83 from the lower chamber 84 by opening the manual valve 109 (FIG. 9) as described with the first embodiment. Thus, the outboard drive 31 (61) may be lowered.

Because of the arrangement above noted, in addition to the compact nature and the advantage of the easy assembling, no machining of the piston rod 116 is necessary. Thus, manufacturing cost can be saved.

It should be noted that in either of the embodiments described above, the plug 104 might have an aperture (passage) that penetrates its body so that the hollow 91 is connected with the lower chamber 84 through this passage. This passage could be in place of or in addition to the lower passage 106. It also is understood that the piston could include a plurality of upper passages 113 and lower passages 106.

Figure 11:
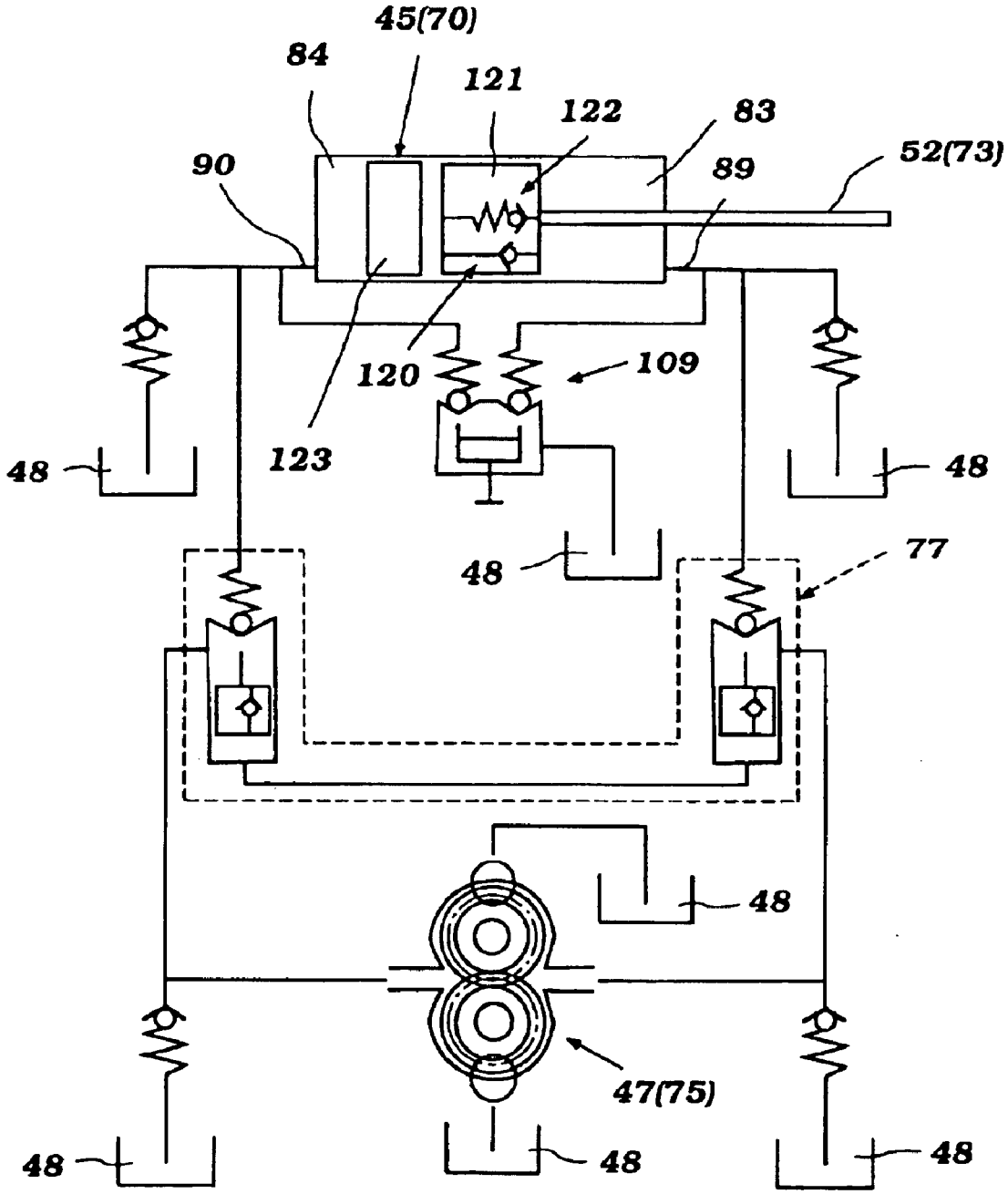

It should be also noted that another arrangement is applicable for returning the fluid in the lower chamber to the upper chamber after pop-up. FIG. 11 shows this arrangement schematically. For the purpose, a return check valve 120 is provided in the piston 121 as well as a shock absorber valve 122 that is described above in detail. This return check valve 120 is much smaller than the shock absorber valve 122. Because the return valve 120 has no spring. In addition, a diameter of its ball is smaller that the diameter of the ball 101 of the shock absorber valve 122. In an exemplary embodiment, the diameter of the return check valve ball is around 3 mm or 4 mm and a diameter of the ball of the shock absorber valve 122, in turn, is around 13 mm or 15 mm. A free piston 123 is provided in the lower chamber 84 for memorizing a tilt up angle by well known principle.

When an underwater obstacle is struck, the same action occurs in the shock absorbing arrangement and the fluid in the upper chamber 83 may flow into the space between the piston 121 and the free piston 128 in the lower chamber 84 through the shock absorber valve 122. The flow of the fluid from the upper chamber 83 to the lower chamber 84 allows the piston 121 to move upwardly and the drive unit to pop-up. After the strike of the underwater obstacle, the fluid in the space of the lower chamber 84 will return to the upper chamber 84 from the lower chamber 83 through the return valve 120 and then the outboard drive 31 (61) may be lowered immediately without operating the manual valve 109.

The manual valve 109, therefore, in this arrangement is only used for urgent release of fluid for tilt down in case of malfunction. In addition, the return valve 120 can be provided in a tilt cylinder 45 (70) that incorporates no free piston. However, if the free piston 123 is applied, the return valve 120 is indispensable. Although the return valve 120 is placed in the periphery of the piston 121, the valve 120 is quite small as described above. Thus, the tilt cylinder 45 (70) may still keep a slimed body.

Although this invention has been described in terms of certain embodiments, other embodiments apparent to those of ordinary skill in the art are also within the scope of this invention. Accordingly, the scope of the invention is intended to be defined only by the claims that follow.

What is claimed is:

1. A positioning mechanism for an outboard drive supported for tilting movement relative to a hull of an associated watercraft about a substantially horizontally disposed tilt axis, the positioning mechanism comprising a fluid motor assembly having a cylinder, a piston slidably supported in the cylinder and defining first and second chambers, a piston rod extending from the piston through one of the chambers, and a shock-absorbing mechanism arranged to permit fluid *to* flow from the first chamber to the second chamber upon the application of a preset force tending to cause the outboard drive to tilt up about the tilt axis, the shock-absorbing mechanism including a check valve assembly principally accommodated in a hollow that is formed in the piston and is closed with a plug attached to the piston.

2. The positioning mechanism as set forth in claim 1, wherein the check valve assembly is substantially aligned with the axis of the piston rod.

3. The positioning mechanism as set forth in claim 1, wherein the [damping] *shock-absorbing* mechanism further comprises a passage connecting the first chamber and the hollow, and the check valve assembly comprises a valve seat located between the passage and the hollow.

4. The positioning mechanism as set forth in claim 3, wherein the passage has a larger diameter than the diameter of the valve seat.

5. The positioning mechanism as set forth in claim 4, wherein the piston rod and the piston are formed separately, and at least a part of the passage passes through a portion of the piston rod.

6. The positioning mechanism as set forth in claim 3, wherein the check valve assembly comprises a ball disposed within the hollow and a retainer for retaining the ball, and a spring for urging the retainer toward the valve seat, the spring being arranged between the retainer and the plug.

7. The positioning mechanism as set forth in claim 1, wherein the [damping] *shock-absorbing* mechanism further comprises a passage passing through the piston rod and opening to the first chamber.

8. The positioning mechanism as set forth in claim 1, wherein the [damping] *shock-absorbing* mechanism further comprises a passage passing through the piston and opening to the first chamber.

9. The positioning mechanism as set forth in claim 1, wherein the [damping] *shock-absorbing* mechanism further comprises a passage passing through the piston and opening to the second chamber.

10. The positioning mechanism as set forth in claim 1, wherein the piston rod is formed separately with the piston and the piston has a recess mating with an end portion of the piston rod, and the piston rod and the piston being jointed with each other so that the piston rod is affixed to the piston.

11. The positioning mechanism as set forth in claim 9, wherein the piston rod has a male threaded end and the piston has a female threaded recess.

12. The positioning mechanism as set forth in claim 1, wherein the second chamber has a free piston.

13. The positioning mechanism as set forth in claim 1, wherein the piston includes at least one return check valve for returning fluid from the first chamber to the second chamber after pop-up.

14. A positioning mechanism for an outboard drive supported for tilting movement relative to a hull of an associated watercraft about a substantially horizontally disposed tilt axis, the positioning mechanism comprising a fluid motor assembly having a cylinder, a piston slidably supported in the cylinder and defining first and second chambers, a piston rod [being formed separately from the piston and affixed to the piston, the piston rod] extending from the piston through one of the chambers, and a shock absorbing mechanism that permits fluid flow from the first chamber to the second chamber upon the application of a preset force tending to cause the outboard drive to tilt up about the tilt axis, the shock-absorbing mechanism including a passage connecting the first chamber and to a hollow formed in the piston, and a check valve assembly principally accommodated in the hollow, the check valve assembly including a valve seat that is located between the hollow and the passage and that has a smaller cross-sectional flow area than a cross-sectional flow area of the passage.

15. The positioning mechanism as set forth in claim 14, wherein at least a part of the passage passes through the piston rod.

16. A positioning mechanism as set forth in claim 14, wherein the valve assembly additionally comprises a ball disposed in the hollow and is positioned against the valve seat, a retainer, and a spring arranged to urge the retainer toward the valve seat with the retainer acting against the valve.

17. In an outboard drive supported for tilting movement relative to a hull of an associated watercraft about a substantially horizontally disposed tilt axis, a positioning mechanism comprising a fluid motor including a cylinder, a piston slidably supported in the cylinder and defining first and second chambers, a piston rod extending from the piston through one of the chambers, and means for allowing the drive unit to pop-up when an underwater obstacle is struck by the outboard drive, the pop-up allowing means including a check valve assembly accommodated in a hollow being formed in the piston and closed with a plug attached to the piston.

*18. The positioning mechanism as set forth in claim 1, wherein the piston rod extends generally vertically through the first chamber, a portion of the piston rod extends out of the first chamber larger when the fluid flows to the second chamber from the first chamber than when the fluid flows to the first chamber from the second chamber.*

*19. The positioning mechanism as set forth in claim 14, wherein the piston rod extends generally vertically through the first chamber, a portion of the piston rod extends out of the first chamber larger when the fluid flows to the second chamber from the first chamber than when the fluid flows to the first chamber from the second chamber.*

*20. The positioning mechanism as set forth in claim 19 additionally comprising a return valve arranged at the piston, the return valve allowing the fluid in the second chamber to return to the first chamber.*

*21. The positioning mechanism as set forth in claim 20, wherein a size of the return valve is smaller than a size of the check valve assembly.*

*22. The positioning mechanism as set forth in claim 14, wherein the piston rod is formed separately from the piston and is affixed to the piston.*

*23. The positioning mechanism as set forth in claim 17, wherein the piston rod extends generally vertically through the first chamber, a portion of the piston rod extends out of the first chamber larger when the fluid flows to the second chamber from the first chamber than when the fluid flows to the first chamber from the second chamber.*

*24. An outboard drive for a watercraft comprising a housing unit, a bracket assembly arranged to support the housing unit to the watercraft for pivotal movement about a generally horizontally extending tilt axis, and a fluid motor arranged to pivotally move the housing unit relative to the watercraft about the tilt axis, the fluid motor comprising a cylinder defining an internal cavity, a piston slidably supported within the cavity, the piston dividing the cavity into first and second chambers, a piston rod extending from the piston generally vertically through the first chamber, and a damping mechanism configured to allow fluid in the first chamber to flow toward the second chamber upon the application of a preset force tending to cause the housing unit to pivot about the tilt axis, the damping mechanism comprising a shock absorbing valve disposed in a hollow defined at the piston, the hollow being closed by a plug.*

*25. The outboard drive as set forth in claim 24, wherein the hollow communicates with the second chamber.*

*26. The outboard drive as set forth in claim 25, wherein the piston additionally defining a flow path communicating with the first chamber and the hollow.*

*27. The outboard drive as set forth in claim 24 additionally comprising a return valve arranged at the piston, the return valve allowing the fluid in the second chamber to return to the first chamber.*

*28. The outboard drive as set forth in claim 27, wherein a size of the return valve is smaller than a size of the shock absorbing valve.*

*29. The outboard drive as set forth in claim 28, wherein the size of the return valve is less than a third of the size of the shock absorbing valve.*

*30. The outboard drive as set forth in claim 28 additionally comprising a second piston slidably supported within the second chamber.*

* * * * *

UNITED STATES PATENT AND TRADEMARK OFFICE

CERTIFICATE OF CORRECTION

PATENT NO. : RE 38,851 E
APPLICATION NO. : 10/227439
DATED : October 25, 2005
INVENTOR(S) : Daisuke Nakamura It is certified that error appears in the above-identified patent and that said Letters Patent is hereby corrected as shown below:

At column 2, line 26, please delete “pop up.” and insert -- pop-up. --, therefor.

At column 2, line 40, please delete “problem” and insert -- problems --, therefor.

At column 5, line 25, please delete “pup-up” and insert -- pop-up --, therefor.

Signed and Sealed this

Sixth Day of May, 2008

JON W. DUDAS
*Director of the United States Patent and Trademark Office*